(12) United States Patent
Albert

(10) Patent No.: US 9,931,980 B1
(45) Date of Patent: Apr. 3, 2018

(54) VOICE MESSAGE WARNING DEVICE FOR A DRIVER OF A MOTOR VEHICLE

(71) Applicant: Christopher John Albert, Woondum (AU)

(72) Inventor: Christopher John Albert, Woondum (AU)

( * ) Notice: Subject to any disclaimer, the term of this patent is extended or adjusted under 35 U.S.C. 154(b) by 0 days.

(21) Appl. No.: 15/626,748

(22) Filed: Jun. 19, 2017

(51) Int. Cl.
   *G08G 1/14* (2006.01)
   *B60Q 9/00* (2006.01)

(52) U.S. Cl.
   CPC .................................... *B60Q 9/00* (2013.01)

(58) Field of Classification Search
   None
   See application file for complete search history.

(56) References Cited

U.S. PATENT DOCUMENTS

| | | | | |
|---|---|---|---|---|
| 2007/0188349 A1* | 8/2007 | Staniszewski | ......... | G07B 15/02 340/932.2 |
| 2012/0233081 A1* | 9/2012 | Hishiki | .................... | G07C 5/04 705/317 |
| 2013/0069774 A1* | 3/2013 | Ajala | .................... | B60K 37/02 340/441 |
| 2014/0275834 A1* | 9/2014 | Bennett | .................. | B60N 2/502 600/301 |

* cited by examiner

*Primary Examiner* — Brent Swarthout

(57) ABSTRACT

A voice message warning device for the driver of a motor vehicle with a three button arrangement set into the front face of a plastic, anodized aluminum or stainless steel case, which once activated play a pre-set recorded message on each button warning the driver of a motor vehicle that his or her parking meter is about to expire, it's time to take a break and to check your speed.

18 Claims, 2 Drawing Sheets

FRONT VIEW

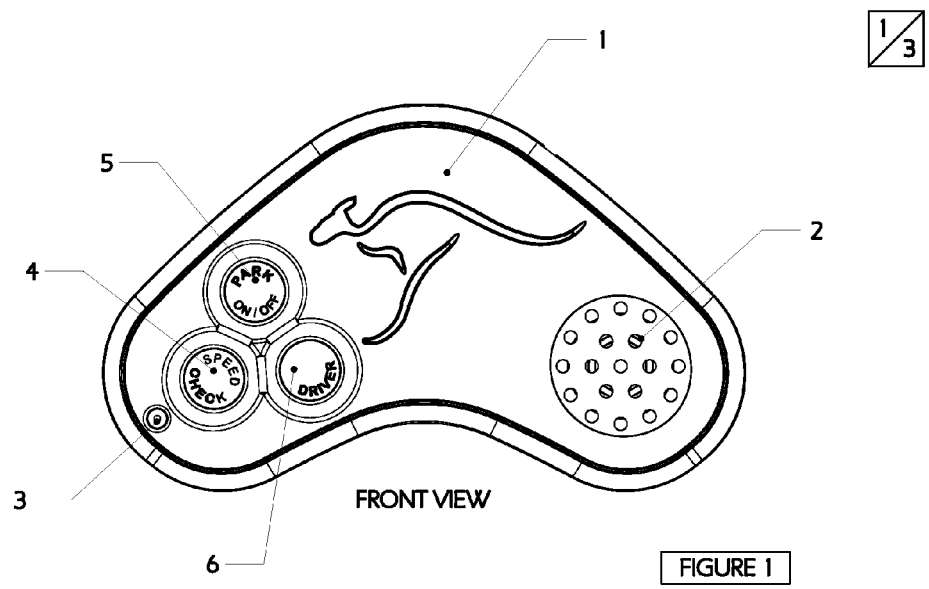

BACK VIEW

PICTORIAL VIEW

VOICE MESSAGE WARNING DEVICE FOR A DRIVER OF A MOTOR VEHICLE

TECHNICAL FIELD

The present invention relates to a device that gives a voice message warning to a driver of a motor vehicle. In particular, the present invention relates to a voice message warning device which is activated by a timer that tells the driver of a motor vehicle that it's time to take a break, the voice message warning device also tells the driver of a motor vehicle to check their speed, the voice message warning device also reminds the driver that their parking meter is about to expire.

BACKGROUND OF THE INVENTION

In today's market place there are many types of warning devices available, most are activated by a load buzzer noise or activated by the head of a driver moving in an upward or downward motion.

In addition the warning devices that are available in today's marketplace are load and may be a distraction to a driver whilst driving.

Thus, it would be an advantage to have a voice message warning, with the voice message being at the same volume level as if the passenger of a car was talking to the driver which may not distract a driver as much as a load buzzer noise.

It will be clearly understood that, if a prior art publication is referred to herein, this reference does not constitute an admission that the publication forms part of the common general knowledge in the art in Australia or in any other country.

SUMMARY OF THE INVENTION

The present invention is directed to a voice message warning device, which may at least overcome one of the above mentioned disadvantages and provide the consumer with a useful or commercial choice.

With the foregoing in view, the present invention in one form, resides broadly in a warning device for the driver of a motor vehicle, the voice message warning device comprising of a plastic, anodised aluminium or stainless steel outer case, three button arrangement recessed in the case, a rechargeable battery, a speaker, a USB port for charging the battery, a LED light to show the warning device is on and charging, a circuit board which contains a CPU (central processing unit) chip a voice chip, a timer chip, a charging chip for the battery, power management chip, voltage control circuit and an ear phone jack.

The voice message warning device may be of any suitable size, shape or configuration. Preferably, however, the shape of the present invention will be that of the Australian Boomerang. It will be understood that the size of the voice message reminder device will be such that it will fit into a driver or passengers hand, pocket or handbag.

It is preferred that the voice message warning device be in the shape of the Australian Boomerang with the Australian Kangaroo engraved in the front face of the plastic, anodised aluminium or stainless steel case near to the activation buttons.

It is envisaged that the plastic, anodised aluminium or stainless steel case that holds the activation buttons, the LED light, the USB charging port, rechargeable battery, the speaker and the circuit board be made of a suitable plastic to with stand high temperatures within a car, the plastic can be ABS plastic, nylon or a combination of both ABS and nylon plastic together, the outer case will be of a size not to be too big or to small, it is envisaged that the size of the outer case be big enough to fit in the driver or passengers hand, pocket or bag.

The plastic, anodised aluminium or stainless steel case that holds the activation buttons, the LED light, the USB charging port, rechargeable battery, the speaker and the circuit board can be of any colour but not limited to one colour, that is the top section of the outer case can be a different colour than the bottom section of the outer case.

The present invention relates to a voice message warning device, more particular the present invention has a three button arrangement recessed in the top of the outer case, the first button nearest the LED light marked park is a voice warning message for a one hour parking meter.

In a preferred embodiment of the invention, when the vehicle is parked in a one hour parking meter zone the driver or passenger presses the button nearest the LED light marked park, when the button is depressed a beep sound is heard, the LED light will begin to flash, in the present invention the LED light will flash every 10 seconds this indicates that the voice message timer for the parking meter reminder message has been activated and set, in ¾ of an hour's time a voice message will be played. The voice message will say. Return to your car, your parking meter is about to expire.

In another embodiment of the invention different languages for the voice message may be recorded, for example in addition to the English language, languages such as Italian, French, German, Russian or other languages may be recorded for the voice message, in addition the voice messages may be recorded in a male or female voice.

A further embodiment of the invention is that the wording of the voice message may be recorded differently to that of,,,,,Return to your car, your parking meter is about to expire, . . . it may be for example, . . . Crikey mate, get back to your car, your parking meter is about to expire.

In the present invention the voice message for the parking meter will repeat itself three times and then turn off, the voice message will automatically be reset to play the parking meter message again in a further ¾ of an hours' time, this can be used for parking in a two hour parking meter zone, the combination of the two ¾ hour voice reminders which is 1½ hours gives the driver or passenger 30 minutes to return to their car before the two hour parking meter expires.

In the present invention you can turn the voice parking meter message off by depressing and holding the parking meter button until you hear two beeps, the LED light will cease to flash indicating that the voice reminder warning for the parking meter is turned off.

Another preferred embodiment of the invention is a two and a half hour voice recorded message for the driver of a vehicle, this message is activated by the second button of the three stage button arrangement marked {driver} located close to the head of the Kangaroo, this is a two and a half hour voice recorded message for a driver of a vehicle who travels long distances, before a driver starts his or her journey they press the button marked {driver} located close to the head of the Kangaroo to activate a voice message for the driver of a vehicle.

The second button marked {driver} is activated by pressing the button until a beep sound is heard, the LED light will begin to flash, in the present invention the LED light will flash every 10 seconds, this indicates that the voice message has been activated and set, in two and a half hours time a voice message will be played, the message will say . . . Hey it's time to stop, take a break, have a coffee and survive your drive.

A further embodiment of the invention is that different languages for the voice message may be recorded, for example in addition to the English language, languages such as Italian, French, German, Russian or other languages may be recorded for the voice message, in addition the voice messages may be recorded in a male or female voice.

In another embodiment of the invention the two and a half hour voice message will repeat its self-three times then turn its self-off, the voice message will be automatically set to come on again in two and a half hours' time, the voice warning message can be turned off by depressing the {driver} button and holding until two beeps are heard, the LED light will cease to flash indicating the voice message has been turned off.

In another embodiment of the invention the third button marked Check speed can be set by depressing the button until a beep sound is heard, the LED light will begin to flash, in the present invention the LED light will flash every 10 seconds, this indicates that the voice message has been activated and set, every 30 minutes a voice message will be played, the message will say,,,,, Check your speed and arrive at your destination safe.

The third button marked Check speed is activated by pressing the button, a beep sound will be heard this indicates that the voice message for the Check speed will be played, the message will automatically be played every 30 minutes.

As previously mentioned different languages for the voice message may be recorded, for example in addition to the English language, languages such as Italian, French, German, Russian or other languages may be recorded for the voice message, in addition the voice message may be recorded in a male or female voice.

As mentioned previously the present invention has a USB charging port in the outer perimeter of the plastic or anodised aluminium case, the USB charging port is connected to a battery which is housed within the plastic or anodised aluminium case, the USB charging port can be connected with a charging lead, similar to that of a mobile phone but not necessarily of the same configuration, one end of the charging lead will plug into a cigarette port within a motor vehicle and the other end of the charging lead will plug into the charging USB port this will then charge the battery housed within the plastic or anodised aluminium case.

In the present invention there is a re-chargeable battery that is housed within the plastic or anodised aluminium case, the re-chargeable battery is connected to the USB charging port by way of two wires, each wire is joined together with a male and female joiner, it is important that the male and female joiners are joined at different positions in the two wires, this is to ensure that the male and female joiners do not come in contact with each other if the wires were to touch. The object of the male and female joiners is that if the battery was to fail the battery can be replaced with ease.

The re-chargeable battery is located in the centre of the plastic or anodised aluminium case between the circuit board and the speaker, the re-chargeable battery is held in place by way of four corner lugs that are moulded in the plastic or anodised aluminium case.

In the present invention there is the speaker, the speaker is joined to the circuit board by way of two wires, each wire is joined together with a male and female joiner, it is important that the male and female joiners are joined at different positions in the two wires, this is to ensure that the male and female joiners do not come in contact with each other if the wires were to touch.

The speaker is located at the opposite end to the circuit board the purpose for this is so the speaker will not distort by being too close to the circuit board, the speaker is held in position by way of a cylindrical plastic lug that is moulded in the plastic or anodised aluminium case.

In a further embodiment of the invention there is a circuit board, the circuit board can be of any shape or configuration, but it is preferred that it is in such a shape to fit the contours of the plastic, anodised aluminium or stainless steel case in which the circuit board is housed.

In a preferred embodiment of the invention there is a CPU chip (central processing unit) located within the circuit board, the CPU chip (central processing unit) controls other devices such as the buttons located on the top of the case, the timer chip, the voice recorded chip and the LED light all located within the circuit board.

In a most preferred embodiment of the invention there is a voice chip located within the circuit board on which the voice messages are stored, a CPU chip (central processing unit) is attached to the voice message chip located within the circuit board, the CPU chip (central processing unit) controls a timer chip which allows the voice messages to be played at a preferred time. There are three recorded messages stored in the voice chip, one is the parking meter voice message which says: Crikey mate get back to your car, your parking meter is about to expire. The voice message may be recorded, for example in addition to the English language, languages such as, Italian, French, German, Russian or other languages may be recorded for the voice message. In addition the voice message may be recorded in a male or female voice.

The second voice message stored on the voice chip located within the circuit board has the voice message stored for the {driver} voice message, which says, Hey it's time to stop, take a break, have a coffee and survive your drive, The voice message may be recorded, for example in addition to the English language, languages such as, Italian, French, German, Russian or other languages may be recorded for the voice message in addition the voice message may be recorded in a male or female voice.

The third voice message stored on the voice chip located within the circuit board has a voice message stored for {speed check} the voice message will say Check your speed and arrive at your destination safe. The voice message may be recorded for example in addition to the English language, languages such as Italian, French, German Russian or other languages may be recorded for the voice message, in addition the voice message may be recorded in a male or female voice.

A CPU chip (central processing unit) is attached to the voice chip located within the circuit board, the voice chip stores the voice recorded messages for the parking meter message the driver message and the check speed message, the CPU (central processing unit) is attached to a solenoid for the parking meter button which is located on the top of the plastic or anodised aluminium case this activates the required voice message.

In another embodiment of the invention the voice chip that stores the voice message for the {driver} Hey it's time to stop, take a break, have a coffee and survive your drive. is attached to the CPU chip (central processing unit) located within the circuit board, the CPU chip (central processing unit) is attached to a solenoid for the driver button which is located on the top of the plastic or anodised aluminium case this activates the required voice message.

In a further embodiment of the invention the voice chip that stores the message for the [Check speed] is attached to the CPU chip (central processing unit) located within the circuit board.

The CPU chip (central processing unit) is attached to a solenoid for the check speed button which is located on the top of the plastic or anodised aluminium case this activates the required voice message.

A further embodiment of the invention is the timer chip, the timer chip is attached to the CPU chip (central processing unit) which controls the time the voice recordings will be activated, as mentioned previously the CPU (central processing unit) is attached to the timer chip and the voice message chip.

Another embodiment of the invention is an ear phone jack located near to the USB charging port on the circuit board, if the driver or passenger of an automobile wishes to hear the message privately the can attach an ear piece to the warning device via the ear phone jack and personalise the voice messages.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

FIG. 1 illustrates a frontal view of the Voice Message Reminder Warning Device according to an embodiment of the present invention.

FIG. 2 illustrates a top view of the Voice Message Reminder Warning Device according to an embodiment of the present invention.

FIG. 3 illustrates a side view of the Voice Message Reminder Warning Device according to an embodiment of the present invention.

DESCRIPTION OF EMBODIMENTS

Figure 4:
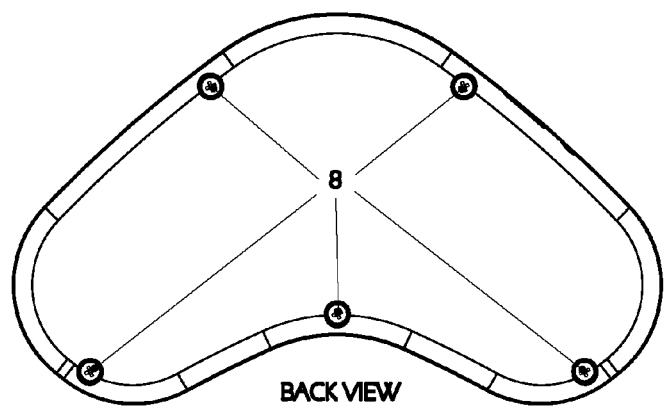
FIG. 4 illustrates a back view of the Voice Message Reminder Warning Device according to an embodiment of the present invention.

FIG. 1. Illustrates the front view of the Voice Message Warning Device 1. According to an embodiment of the present invention the speaker 2. Is recessed into the plastic or aluminium case a further embodiment of the invention is the LED light 3. When the voice message is activated the LED light will flash every 10 seconds showing that the voice message is on and activated.

FIG. 1. there is an illustration of the front face of the Voice Message Warning Device 1. a three button arrangement 4, 5 and 6. is recessed in the face of the plastic or anodised aluminum casing.

FIG. 1. Button 4. Is for the Speed Check message, {Check your speed and arrive at your destination safe.}

FIG. 1. Button 5. Is the on/off button and the button that activates the voice recorded message for the parking reminder message. {Crikey mate, get back to your car, your parking meter is about to expire.}

FIG. 1. Button 6. Is the Driver message button, press the button once to activate the voice recorded message for the driver. {Hey, it's time to stop, take a break, have a coffee, and survive your drive.}

In FIG. 2. There is the top view of The Voice Message Warning Device. The USB port 7. Enables the battery to be recharged with the aid of a USB charging lead. A further embodiment of the invention is the ear phone jack 19. The ear phone jack is used for an ear phone set to enable the driver of an automobile to hear the voice messages in private with no distraction to the passengers.

FIG. 4. Illustrates the back view of the Voice Message Warning Device showing the metal screws 8. Which attach the front and back sections of the Warning Device together.

Figure 5:
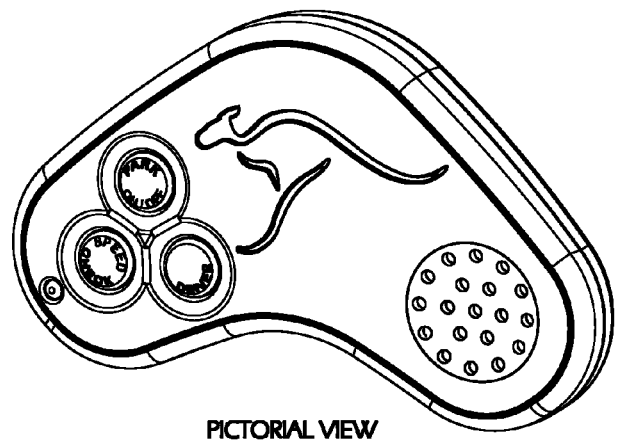
FIG. 5 illustrates an isometric view of the Voice Message Reminder Warning Device according to an embodiment of the present invention.

FIG. 5. Illustrates an isometric view of Voice Message Warning Device according to an embodiment of the present invention.

Figure 6:
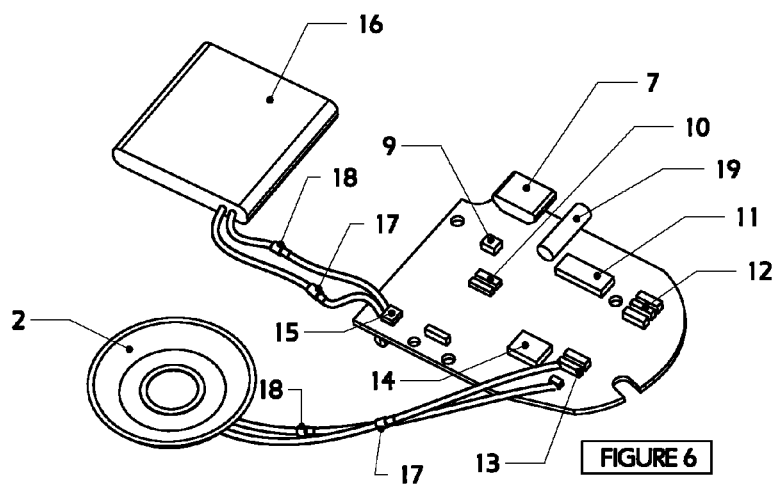
FIG. 6 illustrates a detailed view of the inner parts according to an embodiment of the present invention.

In FIG. 6. A detailed view of the Voice Message Warning Device 1. According to an embodiment of the present invention is illustrated. In particular FIG. 6. Shows the circuit board which houses the main components for the Voice Message Warning Device.

The voice chips 11 and 14 that store the three voice recorded messages for the Parking message, the Driver message and the Speed Check message are attached to a CPU (central processing unit) 12. The CPU chip (central processing unit) is attached to a solenoid 10, which controls the buttons for activating the voice messages.

In FIG. 6. The timer chip 9. Is attached to the CPU chip (central processing unit) 12. Which controls the time the voice messages once activated will play for, for example the parking message will play every forty-five minutes, the driver message will play every two and a half hours and the speed check message will play every thirty minutes until de-activated.

FIG. 6. Shows the battery 16. Attached by way of two wires which have a male and female joiner 17. And 18. Within the wires to allow the battery to be replaced when necessary. The battery is attached to the circuit board by way of a junction box 15. Which attaches to the USB charging port 7. for recharging the battery when necessary.

The speaker 2. Is attached by way of two wires which have a male and female joiner 17. and 18. Within the wires to allow the speaker to be replaced when necessary, the speaker is attached to the circuit board by way of a junction box 13. A circuit is connected from the junction box 13. To an ear phone jack 19. This enables the driver of an automobile to hear the voice messages in private without distracting the passengers of the automobile.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A voice message warning device for the driver of a motor vehicle comprising:
    a housing;
    a first selectively actuatable button configured to enable delayed playback of a first audio message, wherein the message pertains to a parking meter reminder;
    a second selectively actuatable button configured to enable delayed playback of a second audio message, wherein the message pertains to a driving break reminder;
    a third selectively actuatable button configured to enable delayed playback of a third audio message, wherein the message pertains to a speed limit reminder;
    a speaker;
    a control circuit; and
    a battery.

2. The voice message warning device of claim 1, wherein the first selectively actuatable button is engraved with: park.

3. The voice message warning device of claim 1, wherein the second selectively actuatable button is engraved with: Driver.

4. The voice message warning device of claim 1, wherein the third selectively actuatable button is engraved with: Speed Check.

5. The voice message warning device of claim 2, wherein the first audio message states: "Crikey mate, get back to your car, your parking meter is about to expire".

6. The voice message warning device of claim 3, wherein the second audio message states: "Hey, it's time to stop, take a break, have a coffee and survive your drive".

7. The voice message warning device of claim 4, wherein the third audio message states: "Check your speed and arrive at your destination safe".

8. A voice message warning device for the driver of a motor vehicle comprising:
    a boomerang-shaped housing;
    a first selectively actuatable button configured to enable delayed playback of a first audio message, wherein the message pertains to a parking meter reminder;
    a second selectively actuatable button configured to enable delayed playback of a second audio message, wherein the message pertains to a driving break reminder;
    a third selectively actuatable button configured to enable delayed playback of a third audio message, wherein the message pertains to a speed limit reminder;
    a speaker;
    a control circuit comprising a CPU, a timer chip, and a voice chip; and
    a rechargeable battery.

9. The voice message warning device of claim 8, further comprising:
    a LED light; and
    a USB charging port.

10. The voice message warning device of claim 8, wherein the first audio message is played by the speaker after a predefined time period.

11. The voice message warning device of claim 9, wherein the LED light will transmit light upon actuation of any one of the actuatable buttons to indicate successful actuation and countdown to playback of one of the first, second, and third audio messages.

12. The voice message warning device of claim 8, wherein the first, second, and third audio messages may be associated with a selectable language.

13. The voice message warning device of claim 8, wherein the first, second, and third audio messages may be associated with a selectable gender.

14. The voice message warning device of claim 8, wherein the first, second, and third audio messages may be personalized by recording a message.

15. The voice message warning device of claim 8, wherein the first, second, and third audio messages are repeated a predefined quantity, then delayed a predefined time period, then repeated the predefined quantity.

16. The voice message warning device of claim 15, wherein each of the first, second, and third audio messages are each associated with a different predefined time period preceding playback.

17. The voice message warning device of claim 8, wherein the first, second, and third audio messages may be turned OFF by actuating one of the first, second, and third buttons.

18. The voice message warning device of claim 8, further comprising: an ear phone jack.

* * * * *